(12) United States Patent
Hossick-Schott

(10) Patent No.: US 7,224,576 B2
(45) Date of Patent: May 29, 2007

(54) HIGH CAPACITANCE ELECTRODE AND METHODS OF PRODUCING SAME

(75) Inventor: Joachim Hossick-Schott, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 40 days.

(21) Appl. No.: 10/816,795

(22) Filed: Apr. 2, 2004

(65) Prior Publication Data
US 2005/0090108 A1 Apr. 28, 2005

Related U.S. Application Data

(60) Provisional application No. 60/514,371, filed on Oct. 23, 2003, provisional application No. 60/514,372, filed on Oct. 23, 2003.

(51) Int. Cl.
*H01G 9/04* (2006.01)
*H01G 9/145* (2006.01)

(52) U.S. Cl. ........................ 361/516; 361/503
(58) Field of Classification Search ......... 361/502–517
See application file for complete search history.

(56) References Cited

U.S. PATENT DOCUMENTS

| | | | |
|---|---|---|---|
| 3,243,316 A | 3/1966 | O'Nan | |
| 4,456,518 A * | 6/1984 | Bommaraju | 204/290.08 |
| 5,369,547 A | 11/1994 | Evans | |
| 5,709,711 A * | 1/1998 | Fain | 607/8 |
| 5,754,394 A * | 5/1998 | Evans et al. | 361/516 |
| 2001/0024700 A1* | 9/2001 | Shah et al. | 427/600 |
| 2001/0026850 A1* | 10/2001 | Shah et al. | 427/600 |

FOREIGN PATENT DOCUMENTS

WO    WO 97/36023    10/1997

* cited by examiner

*Primary Examiner*—Eric W. Thomas
(74) *Attorney, Agent, or Firm*—Paul H. McDowall; Girma Wolde-Michael

(57) ABSTRACT

The present invention provides improved cathodes and methods for producing such cathodes for ultimate use in conjunction with valve metal capacitors. A family of titanium carbide cathodes according to the present invention can be produced so that they inhabit a pre-existing metallic surface such as an inner surface of a titanium casing adjacent but insulated from direct electrical communication from an anode. Foil-type valve metal anodes as well as porous valve metal anodes formed from metallic powders may be used in conjunction with the titanium cathodes of the present invention.

10 Claims, 5 Drawing Sheets

HIGH CAPACITANCE ELECTRODE AND METHODS OF PRODUCING SAME

CROSS REFERENCE TO RELATED APPLICATIONS

The present provisional patent application claims the benefit of prior provisional application Ser. No. 60/514,371 filed Oct. 23, 2003 having common title, provisional U.S. patent application Ser. No. 60/514,372 filed on 23 Oct. 2003 and entitled, "METHODS OF PRODUCING CARBON LAYERS ON TITANIUM METAL," and relates to non-provisional U.S. patent application Ser. No. 10/692,649 filed 23 Oct. 2003 and entitled, "ADVANCED VALVE METAL ANODES WITH COMPLEX INTERIOR AND SURFACE FEATURES AND METHODS FOR PROCESSING SAME," the contents of each said prior application is hereby incorporated by reference herein.

FIELD OF THE INVENTION

The present invention generally relates to improved capacitors; in particular, the present invention provides cathodes for use with valve metal anodes and methods for fabricating such cathodes to produce high energy density capacitors. More particularly, such cathodes find use in high voltage capacitors incorporated into implantable medical devices (IMDs), among other uses.

BACKGROUND OF THE INVENTION

The term "valve metal" represents a group of metals including aluminum, tantalum, niobium, titanium, zirconium, etc., all of which form adherent, electrically insulating metal-oxide films upon anodic polarization in electrically conductive solutions. The performance of valve metal anodes in an actual capacitor depends upon several factors, e.g., the effective surface area of the anodes and cathodes that can be contacted by electrolyte, the dielectric constant of the oxide formed on the metal surface, the thickness of the oxide layer on top of the metal surface, the conductivity of the electrolyte, etc. The thickness of the anodic oxide layer is approximately proportional to the electrical potential applied to the anode during the formation of the anode (i.e., at the time when the anode is immersed into the formation electrolyte). For aluminum, the oxide grows approximately by ~1.1 nm per Volt, for tantalum this "growth rate" is somewhat higher, approximately 1.8 nm per Volt. Niobium and tantalum anodes are typically made in the form of a pressed powder pellet or "slug" when used in an electrolytic capacitor.

The density of the pressed anode slug is typically significantly less than the density of the bulk metal of which the powder is made, i.e., up to $2/3$ of the volume of a given slug may be open space (pore space). The final density of the anode slug is largely determined at the time of pressing, when a known amount of powder is pressed into a known volume. Traditionally, formation of the anode slug has been thought to require a fairly homogeneous distribution of open space throughout the anode slug since the forming electrolyte needs to wet even the most "remote" cavities in the karst-like internal structure of the anode. This is specifically important for comparatively large anodes with volumes of the order 1 $cm^3$ or above.

In the context of medical devices, capacitors are typically charged and discharged rapidly for delivery of low voltage or high voltage stimuli. Upon or during detection of a potentially lethal arrhythmia, suitable electrical transformer circuitry charges one or more high voltage capacitors using a low voltage battery as a charge source. Then, at an appropriate time the energy stored in the capacitor(s) discharges through a pair of electrodes disposed in or near a patient's heart. The discharged energy is used to terminate the arrhythmia and restore organized cardiac activity. Medical devices that deliver cardioversion and/or defibrillation therapy include automated external defibrillators (AEDs) and implantable cardioverter-defibrillators (ICDs). For purposes of the present invention, an ICD is understood to encompass all such IMDs having at least high voltage cardioversion or defibrillation capabilities. In most all IMDs, energy, volume, thickness and mass are critical features. The battery(s) and high voltage capacitor(s) used to provide and accumulate the energy required for the effective cardioversion/defibrillation therapy have historically been relatively bulky and expensive. Therefore, the industry has been working towards smaller battery and capacitor volumes. A high capacitance cathode, such as the one proposed herein, contributes to these on-going efforts.

SUMMARY

The present invention provides improved cathodes and methods for producing such cathodes for ultimate use in conjunction with valve metal capacitors. The family of cathodes according to the present invention can be produced so that they inhabit a pre-existing metallic surface such as an inner surface of a titanium casing adjacent to but insulated from direct electrical communication with an anode. Foil-type valve metal anodes may be used in conjunction with the cathodes of the present invention; however, porous valve metal anodes (formed from metallic powders of tantalum, niobium; etc.) are advantageously employed.

One exemplary embodiment of the present invention involves depositing a layer of carbon onto an inner surface of a capacitor casing. The inner surface comprises titanium and may include a portion of the casing itself or one or more discrete titanium plates disposed within said casing.

Many of the details regarding the cathodes and processing steps for producing such anodes are known in the art. However, the material selection is a critical aspect of the present invention; namely, in lieu of other cathode materials to the fullest extent possible at least the combination of a carbon material deposited on titanium including all the processes, methods, compositions and structures of the invention as described herein.

It is well known that an electrolytic capacitor such as those used in cardiac devices such as an implantable cardioverter-defibrillator (ICD) can be described as two capacitors electrically coupled together in series. That is, a first capacitor described herein as an "anode-side capacitor," typically comprising anodized aluminum or tantalum, and the largely negatively charged ions contributed by a fluidic electrolyte acting as a cathode. The anode-side capacitor can also be termed a "first double layer." A second capacitor described herein as a "cathode-side capacitor," typically comprising a cathode-active material and the largely positively charged ions contributed by a fluidic electrolyte acting as an anode. The cathode-side capacitor can be termed a "second double layer." The amount of charge ("Q") for both the double layers, that is, the "anode-side capacitor" and the "cathode-side capacitor," must be of equal magnitude and opposite polarity. That is: $C_a U_a = C_c U_c$ with "C" denoting the capacitance and "U" denoting the voltage of the anode and cathode, respectively. (Of course, the subscript letters represent anode and cathode.) In addition, it is believed that the voltage drop across all double layer regions must remain at or about one volt, otherwise gases may be formed via electrolysis (a potentially serious problem for an IMD). Thus, it follows that for a capacitor having a capacitance of about 300 micro-Farad and to be operated at 250 volts, the cathode needs a capacitance of about 100 milli-Farad. The foregoing was based on a typical housing, or enclosure, for a capacitor operatively coupled to an ICD has about 10 square centimeters of available surface area, such that the specific capacitance of the cathode should be on the order of 10 milli-Farad per square centimeter. The present invention provides a novel and non-obvious way to achieve this capacitance value for the cathode of the capacitor. Stated in a slightly different manner, for an exemplary cathode usable in a wet electrolytic tantalum capacitor operatively coupled to an ICD, the following approximate values and dimensions may be considered: the carbon cathode layer can occupy approximately 10 square centimeters of surface area of titanium substrate on the interior of the capacitor enclosure. The total capacitance $C_{total}$ of any electrolytic capacitor consists of the sum of the two individual capacitors $C_{anode}$ and $C_{cathode}$ and is expressed by the formula $1/C_{total} = 1/C_{anode} + 1/C_{cathode}$. In order to maximize $C_{total}$, the capacitance $C_{cathode}$ has to be as large as possible. Thus the specific capacitance of the cathode should be on the order of about 10 mF/cm² (or larger).

It is believed that a relatively thin (e.g., greater than about one micrometer-deep layer of carbon) heat-processed layer of carbon deposited onto a titanium substrate meets the foregoing specification for a 250 volt capacitor for an ICD (depending to a degree upon actual processing conditions). Even if a relatively large portion of the deposited carbon is removed (or displaced) from its original location, the remaining carbonaceous material at the titanium carbon interface seems to provide adequate specific capacitance so that the capacitor cell continues to operate effectively (i.e., deliver cardioversion and/or defibrillation therapy). The mechanism for such continued operation is not fully understood at this time; however, it is likely that the carbonaceous material remaining at the titanium-carbon interface consists mostly of titanium carbide material, since the above-mentioned processing involves a vacuum heat treatment step. This interfacial material apparently provides enough capacitance to keep the capacitor balanced. Thus, capacitors containing cathodes fabricated according to the present invention possess a degree of fault tolerance, an especially desirable trait when such capacitors are deployed in an IMD. That is, According to the present invention many various techniques may be employed for initially placing a coating of carbon onto a metallic substrate, preferably titanium. While other techniques may be used, the following techniques are hereby expressly described and claimed herein.

The carbon material may comprise any form of carbon, including graphite, a polymorph of the element carbon, as well as relatively pure forms of carbon black (also known as carbon soot, lamp black, channel black, furnace black, acetylene black, thermal black, etc.). Alone or in combination with one or more of the foregoing forms of carbon black, carbon nanotube material may be used in practicing the present invention. Such nanotube material may include either single-wall nanotubes (SWNT) or multiple-wall nanotubes (MWNT). The carbon, whether in a pure form, nanotube form, or otherwise, can be impregnated with or carried in a fluid vehicle or solution. Appropriate solutions include any material that will be driven off during annealing, such as for example volatile organic solvents and certain polymeric materials.

BRIEF DESCRIPTION OF THE DRAWINGS

The foregoing and other aspects and features of the present invention will be appreciated as the same becomes better understood by reference to the following detailed description of the various embodiments of the invention when considered in connection with the accompanying drawings, in which like numbered reference numbers designate like parts throughout. The drawings are not drawn to scale and are merely representative of just a few exemplary embodiments of the present invention. Other embodiments clearly within the scope of the present invention will be readily apparent to those of skill in the art, and each such embodiment is intended to be covered hereby, limited only by the claims appended hereto.

DETAILED DESCRIPTION OF THE ILLUSTRATED EMBODIMENTS

The present invention provides improved cathodes and methods for producing such cathodes for ultimate use in conjunction with AVM capacitors. The family of cathodes according to the present invention can be produced so that they inhabit a pre-existing metallic surface such as an inner surface of a titanium casing adjacent to but insulated from direct electrical communication from an anode. Foil-type valve metal anodes (such as aluminum) may be used in conjunction with the cathodes of the present invention; however, porous valve metal anodes (formed from metallic powders of tantalum, niobium, etc.) are advantageously employed.

One exemplary embodiment of the present invention involves depositing a layer of carbon onto an inner surface of a capacitor casing. The inner surface comprises titanium and may include a portion of the casing itself or one or more discrete titanium plates disposed within said casing.

For an exemplary cathode usable in a wet tantalum capacitor operatively coupled to an implantable cardioverter-defibrillator (ICD), the following approximate values and dimensions may be considered: The carbon cathode layer may occupy approximately 10 available square centimeters of surface area on a titanium substrate. The total capacitance $C_{total}$ of any electrolytic capacitor consists of the sum of the two capacitors $C_{anode}$ and $C_{cathode}$ and is expressed by the formula $1/C_{total}=1/C_{anode}+1/C_{cathode}$. In order to maximize $C_{total}$, the capacitance $C_{cathode}$ has to be as large as possible. Thus the specific capacitance of the cathode should be on the order of about 10 mF/cm$^2$ or larger. A thin, processed layer of carbon deposited onto a titanium substrate may meet this specification. Even if a relatively large portion of the deposited carbon is removed (or displaced) from its original location, the remaining carbonaceous material at the titanium carbon interface apparently provides adequate specific capacitance so that the capacitor cell continues to operate. The mechanism for such continued operation is not fully understood at this time; however, it is likely that the carbonaceous material remaining at the titanium-carbon interface consists mostly of titanium carbide material, since the above-mentioned processing involves a vacuum heat treatment step. This interfacial material apparently provides enough capacitance to keep the capacitor balanced. Thus, capacitors containing cathodes fabricated according to the present invention possess a degree of fault tolerance, an especially desirable trait when such capacitors are deployed in an IMD.

Figure 1:
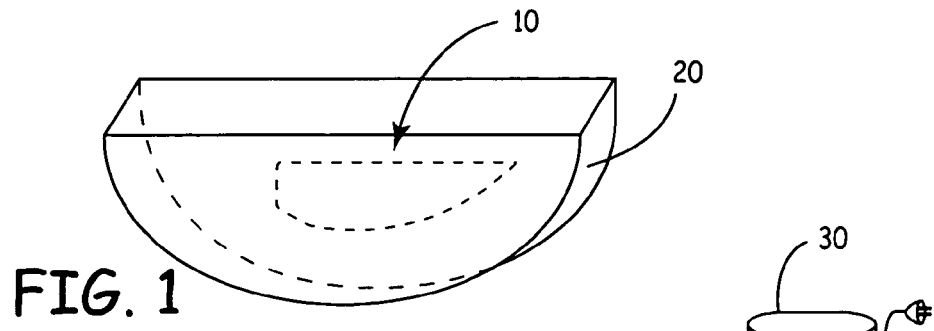
FIG. 1 is a perspective view of an exemplary titanium casing for a D-shaped capacitor illustrating the major interior surface that can serve as a substrate according to the present invention.

FIG. 1 is a perspective view of an exemplary titanium casing 20 for a D-shaped capacitor illustrating the major interior surface region 10 that can serve as a substrate according to the present invention. According to the present invention various techniques may be employed for placing a coating of carbon (denoted by reference numeral 25 in other drawings) onto a metallic substrate 20, such as titanium. While other techniques may be used, the techniques described herein are hereby expressly described and claimed herein.

Figure 2:
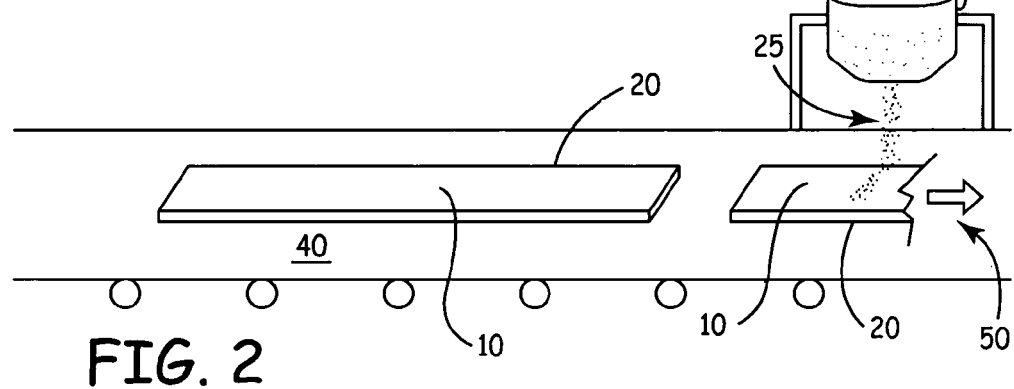
FIG. 2 is a perspective view of a system for depositing a carbon cathode onto a series of discrete pieces of titanium substrate wherein the pieces are moved past a stationary carbon emitting apparatus.

FIG. 2 is a perspective view of a system for depositing a carbon material 25 as a cathode onto a region 10 of a series of discrete pieces of titanium substrate 20 wherein the pieces 20 are moved past a stationary carbon emitting apparatus 30. The apparatus 30 may comprise an ink jet printing device having one or more discrete print heads with each print head having a plurality of ink emitting ports. The ink may comprise a carbon-containing fluid vehicle, such as a dye-based ink, or simply carbon black pigment suspended in one or more inks suitable for ink jet printing. Such a vehicle may include glycol and the like as is known in the ink jet printing art. Off-the-shelf carbon black ink jet inks may also be used. According to this form of the present invention, the ink jet printing technique can include thermal ink jet printing wherein a small resistor proximate a fluid- or ink-emitting aperture heats a small volume of fluid, essentially boiling the volume of fluid, so that a bubble of the fluid rapidly ejects from the aperture. Other forms of ink jet printing are also contemplated and covered hereby, including piezoelectric ink ejection from a print head. In this form of the invention, an electrical signal pulses through a piezoelectric material and causes the material to flex so that a minute volume of fluid is ejected from an adjacent aperture. Such printing may be favored in the event that the fluid should not be heated or boiled. For example, if a polymeric ink or fluid containing carbon was used the performance of a thermal ink jet print head could be expected to suffer as compared to a piezoelectric print head since the fluid would most likely polymerize around the apertures of the print head. In comparison, a "cold fluid" piezoelectric printing process would likely eject the polymeric fluid much more consistently and readily. After the carbon-containing fluid 25 was ink jet printed onto a substrate 20 (preferably to a consistent depth or thickness using consistent drop size) subsequent post-processing may be desirable. Such processing could include an annealing step (preferably in a vacuum chamber) at approximately 600–1000 degrees Celsius to generate a titanium carbide (TiC) layer, vaporize solvent and pyrolize any polymer present in the printing ink or fluid. A second annealing step, also known as activation step, may then be performed wherein the cathode is annealed in an oxygen-containing atmosphere for about 0.1 to 4 hours at approximately about 200–500 degrees Celsius. To the extent that portions of the carbon layer are not tightly bound to the substrate, same may be removed (e.g., under ultrasound agitation or the like).

Figure 3:
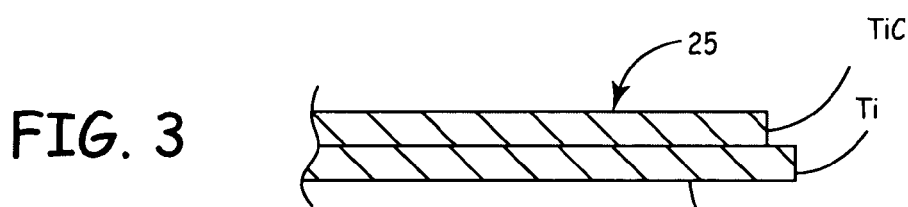
FIG. 3 is an elevational cross-sectional view of titanium surface interface with a carbon layer deposited thereon that, upon vacuum heat processing, results in the formation of an interfacial layer of titanium carbide (TiC).

FIG. 3 is an elevational cross-sectional view of an interface between a titanium surface 10 and a carbon layer 25 deposited thereon to form an interfacial titanium carbide (TiC) at the carbon-titanium interface.

Figure 4:
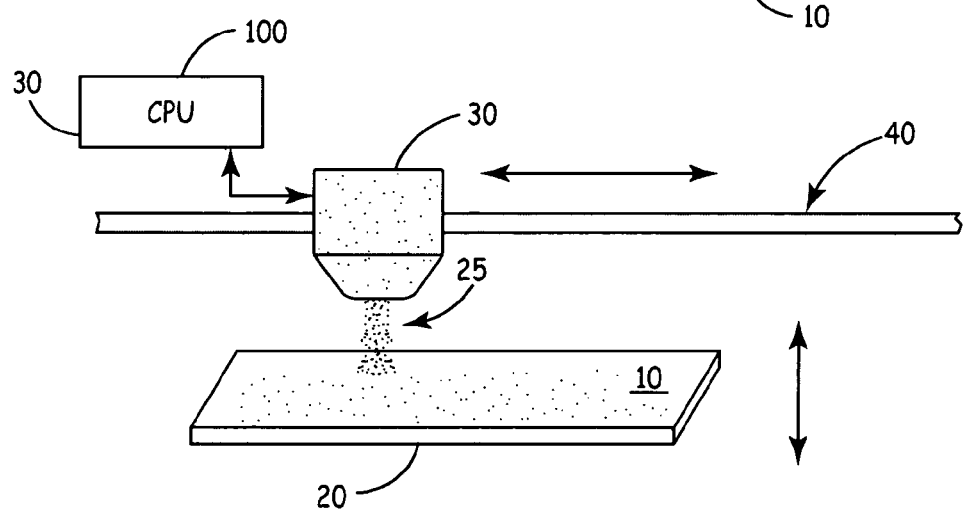
FIG. 4 is a perspective view of a system for depositing a carbon cathode onto a discrete piece of titanium substrate wherein printing head (or carbon emitting apparatus) reciprocates back and forth as it emits carbon or carbon-containing material onto the substrate.

FIG. 4 is a perspective view of a system for depositing a carbon 25 material as a cathode onto a discrete piece 10 of titanium substrate 20 wherein a printing head 30 (or a carriage for another carbon emitting apparatus) reciprocates back and forth along an axial member 40 as the head 30 emits carbon 25 or carbon-containing material onto the substrate 20.

Figure 5:
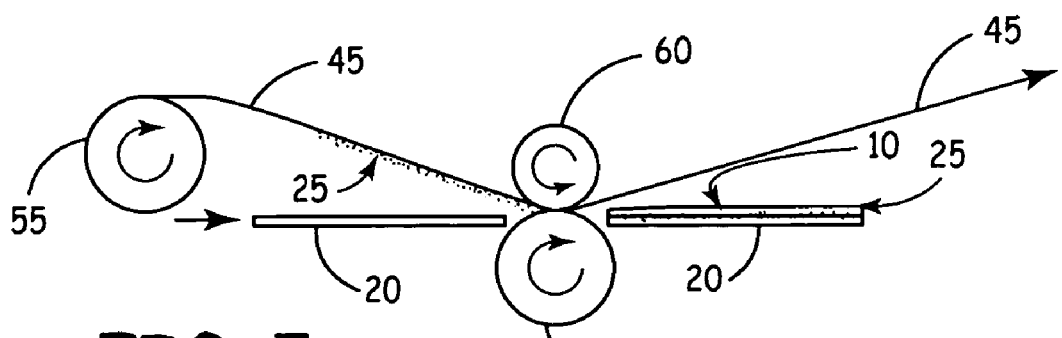
FIG. 5 is a perspective view of a system for depositing a carbon cathode onto a series of discrete pieces of titanium substrate wherein the pieces move past a common location wherein a carbon-containing ribbon is pressed against the substrate under pressure and/or heated conditions to apply carbon to the substrate.

FIG. 5 is a perspective view of a system for depositing carbon 25 as a cathode onto a series of discrete portions 10 of titanium substrate 20, that move past a common location. A carbon-containing ribbon 45 is pressed against the substrate 20 under pressure and/or heated conditions between reciprocating platens 60,70/to apply the carbon 25 to the substrate 20. This process for placing carbon 25 on a substrate 20 includes traditional thermal transfer printing of carbon 25 from a transfer ribbon 45 to a desired region 10 of the substrate 20. Some advantages for this process include no overspray, accurate coating, constant coating thickness and dimension, and the like. In one form of this aspect of the invention, a carbon coated polymeric ribbon 45 is used to transfer carbon 25 to the surface of a substrate 20. The ribbon 45 typically includes a release liner (or layer) so that the carbon material 25 essentially adheres after the substrate 20 and the (heat resistant) ribbon 45 are heated and placed in contact with the substrate 20. As noted above certain post-processing of the deposited carbon may be desirable. Such processing could include an annealing step (preferably in a vacuum chamber) at approximately 600–1000 degrees Celsius to generate a titanium carbide (TiC) layer, vaporize solvent and pyrolize any polymer present in the printing ink or fluid. A second annealing step, also known as activation step, may then be performed wherein the cathode is annealed under ambient air conditions for about 0.1 to 4 hours at approximately about 200–500 degrees Celsius. To the extent that portions of the carbon layer are not tightly bound to the substrate, same may be removed (e.g., under ultrasound agitation or the like).

Figure 6:
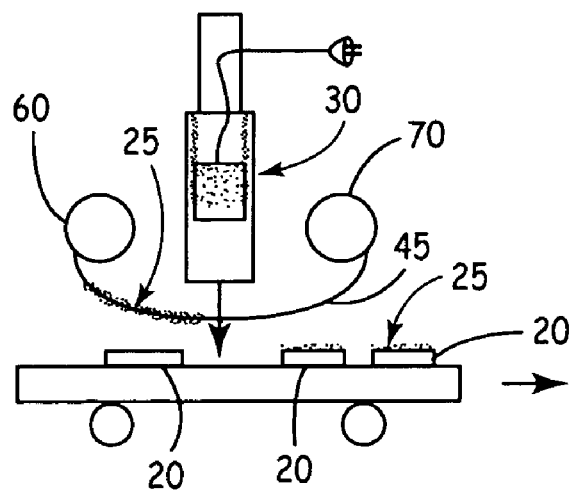
FIG. 6 is a perspective view of a stamping process for stamping a carbon-containing ribbon against a substrate so that the carbon is transferred to the substrate, and optionally, wherein the substrate is stamped into a desired configuration or shape.

FIG. 6 is a perspective view of a stamping process for stamping a carbon-containing ribbon 45 against a substrate 20 so that the carbon 25 is transferred to the substrate 20, and optionally, wherein the substrate 20 is stamped into a desired configuration or shape. In this form of the present invention, similar to the above-described thermal ribbon mode of depositing carbon 25 onto a substrate 20 a heated (e.g., resistively heated) ribbon is placed between a stamping tool 30 and a substrate 20 and an axially extending part of the tool 30 is pressed onto the substrate 20. Thus, the head of the tool can correspond to the dimensions of the finished cathode (i.e., the substrate 20) and may, if desired, be used to form the physical dimension(s) of the substrate 20 to a configuration or shape to correspond to other components of the capacitor (or interior portion of the electrical device in which the capacitor is placed). As with the prior techniques, post processing may be employed here as well.

Figure 7:
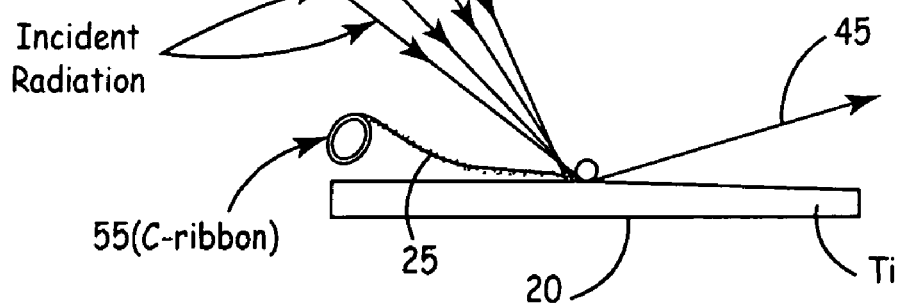
FIG. 7 is a perspective view depicting a dye sublimation process for applying carbon to a substrate using a focused beam of radiation that impinges upon a carbon-containing medium, such as a ribbon so that the carbon is released from the ribbon via sublimation and adhered to the substrate.

FIG. 7 is a perspective view depicting a dye sublimation process for applying carbon 25 to a substrate 20 using a focused beam of radiation from a laser source 80 that impinges upon a carbon-containing medium 55, such as a ribbon so that the carbon 25 is released from the ribbon 45 via sublimation and adhered to the substrate 20. In this form of the present invention a source of radiation 80 (e.g., a laser) couples to a processor 100 to generate radiation that passes through a lens 90 (or other optical elements) and generates a focused beam on a dye sublimation ribbon 55. The carbon (pigment) 25 rapidly sublimes and is deposited onto the substrate 20 which is in close contact with the ribbon 55. As noted previously, various post-processing of the carbon layer may optionally be performed.

Figure 8:
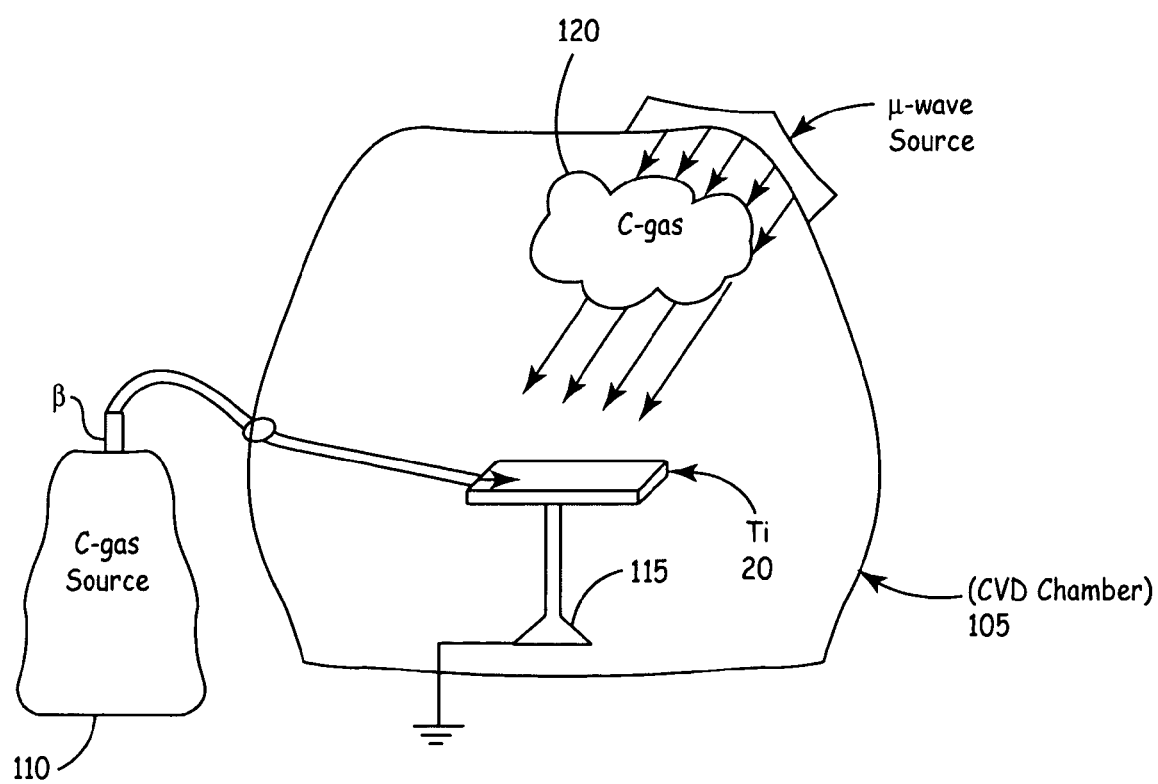
FIG. 8 is a simplified representation of a chemical vapor deposition apparatus that may be used in depositing or growing a layer of carbon on a titanium substrate.

FIG. 8 is a simplified representation of a chemical vapor deposition apparatus 105 that may be used in depositing or growing a layer of carbon 25 on a titanium substrate 20. Chemical vapor deposition (CVD) of carbon 25 onto titanium 20 may be practiced according to the present invention, optionally with methane or acetylene cracking. In this form of the invention, a 600–800 degrees Celsius stream of methane, acetylene or other hydrocarbon gas from a source or tank 110 is directed onto a titanium substrate 20 that is restrained to a relatively lower temperature base member 115. As a result a layer of carbon 25 grows on the surface 10 of the substrate 20. If too thick a layer of carbon 25 grows on the substrate 20 a variety of means of reducing the layer may be employed and, as before, various post-processing steps may be performed to render a robust carbon coating on the substrate. Optionally, portions of the substrate may need to be masked off so that the carbon layer grows only in desired locations. In a related embodiment, a plasma enhanced CVD may be used according to the present invention. In this form of the invention, a high intensity microwave source 120 ionizes a carbon-containing gas from a source 110 in a CVD chamber 105. The ionized fragments from the gas 120 are then deposited and grow on the substrate 20. As a result a layer of carbon 25 grows on the surface 10 of the substrate 20. If too thick a layer of carbon grows on the substrate 20 a variety of means of reducing the layer may be employed and, as before, various post-processing steps may be performed to render a robust titanium-carbide coating on the substrate. Optionally, portions of the substrate may need to be masked off so that the carbon layer grows only in desired locations. Again, various post-processing steps may be performed to produce a final, robust carbon coating.

A method or process 200 of preparing the electrode 100 is now described with reference to FIGS. 9A, 9B and 9C. For ease of reference, a flow diagram illustrating such a method or process 200 is provided as FIG. 10.

Figure 9A:
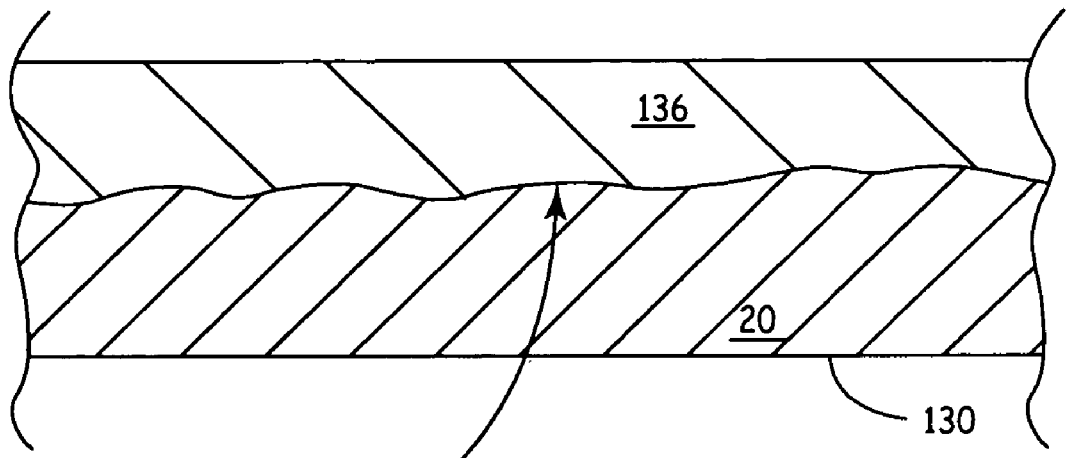
FIGS. 9A, 9B and 9C depict elevational cross-section views depicting a layer of carbon disposed on a titanium substrate, a titanium carbide layer formed therebetween and the structure formed after any remaining carbon is removed leaving only a titanium carbide cathode surface, respectively.
Figure 10:
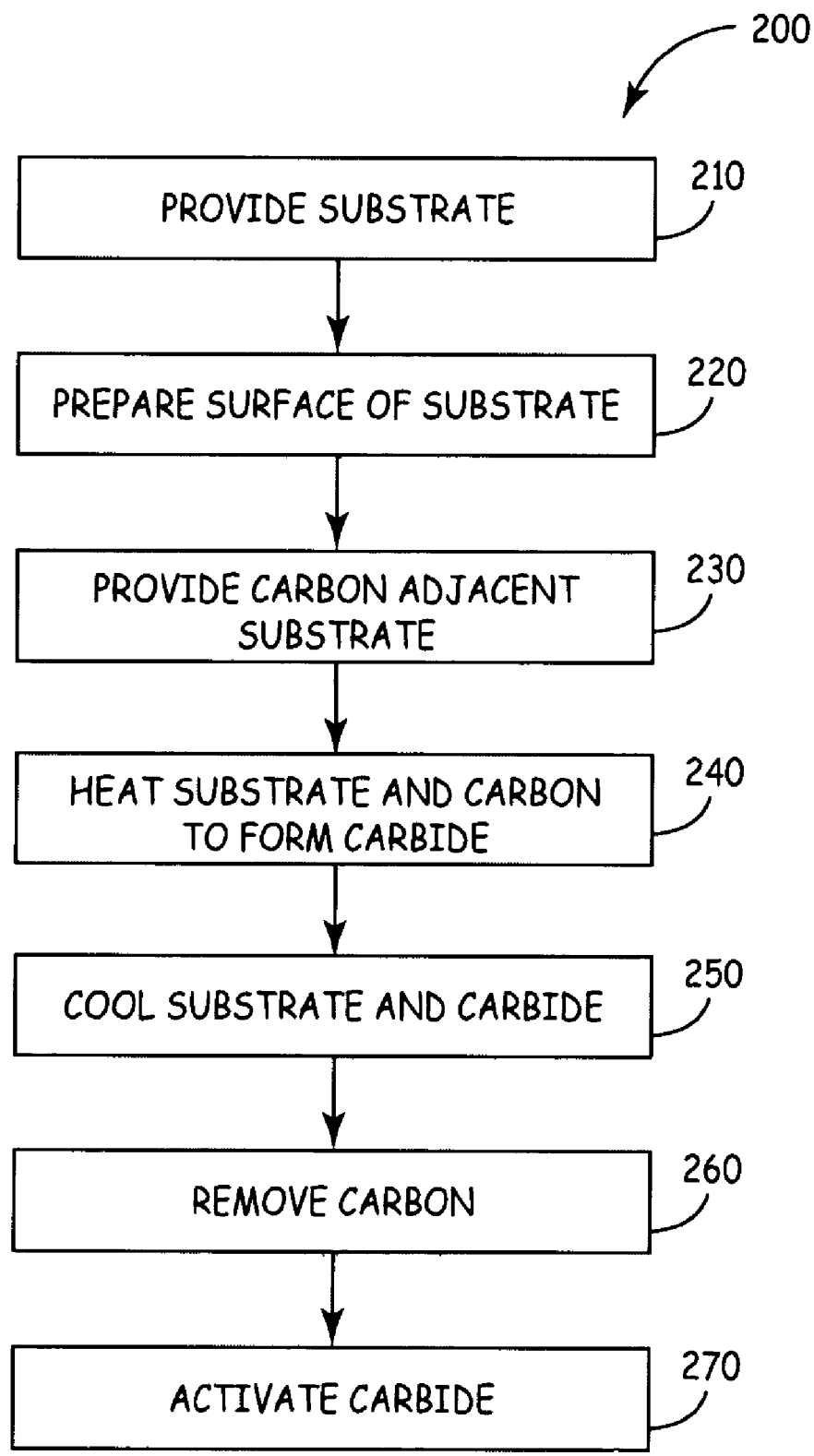
FIG. 10 is a flow chart depicting a method of providing carbon on a titanium substrate and treating the carbon and substrate according to one embodiment of the invention.

As depicted in FIG. 9A and FIG. 10, the substrate 20 is provided in a step 210. As previously described, the substrate 20 comprises titanium or a titanium alloy and is provided as a part of an enclosure for an electrochemical cell, or a portion of a foil or sheet of titanium metal having opposing major surfaces 130,132.

In a step 220, the surface 132 of the substrate 20 is altered or deformed to have a relatively rough characteristic or configuration. Various methods may be used to provide the surface 132 with its relatively rough surface finish. For example, according to an exemplary embodiment, a grit blasting technique may be utilized to alter the surface 132. The grit may be alumina ($Al_2O_3$) or silicon carbide (SiC) having a particle diameter of about 1 micrometer. The grit may be accelerated using compressed air at pressures between approximately 20 and 40 psi.

According to another exemplary embodiment, an etching process may be utilized to provide the surface 132 with a relative surface finish. For example, oxalic acid may be utilized at a temperature of approximately 80° C.

According to another embodiment, the substrate 20 may be provided with a roughened surface portion (at 132) without the need to perform a separate processing step. For example, sintered metal particles (e.g., sintered titanium) may be deposited on a metal sheet surface (e.g., a titanium sheet) using a vacuum sintering process.

Referring to FIG. 10, in a step 230, a carbon layer 136 (e.g., a layer of carbon containing material) is provided adjacent at least a portion of the substrate 20. According to another embodiment, the carbon layer 136 may be provided as a suspension of carbon or graphite powder in alcohol (e.g., methanol, isopropanol, etc.), and may be provided in either a polymerizable or non-polymerizable form.

The carbon layer 136 may be deposited or formed by any suitable means. As described and depicted herein, the carbon layer 136 may be provided using a an electrostatic spray gun or an equivalent alternative device. The particular deposition method employed should be chosen based on a variety of factors, including cost, manufacturability, and desired characteristics for the deposited material.

According to an embodiment, the carbon layer 136 includes graphite particles having particle sizes of approximately 1 micrometer (e.g., between approximately 0.1 and 2 micrometers). One nonexclusive example of such material is commercially available as a graphite, colloidal, lubricant, aerosol spray by Alfa Aesar of Ward Mill, Mass. The carbon material is provided as a suspension of graphite in isopropanol. According to alternative embodiments, other types of alcohol may be used in place of or in addition to isopropanol.

According an embodiment, instead of a single layer the carbon layer 136 includes multiple layers of carbon-containing material that are deposited in multiple deposition steps. For example, the carbon layer 136 may include between 3 and 20 layers of carbon-containing material and may have a thickness of between approximately 20 and 30 micrometers. The number of layers and the thickness of the carbon layer may vary according to a variety of alternative embodiments.

Figure 9B:
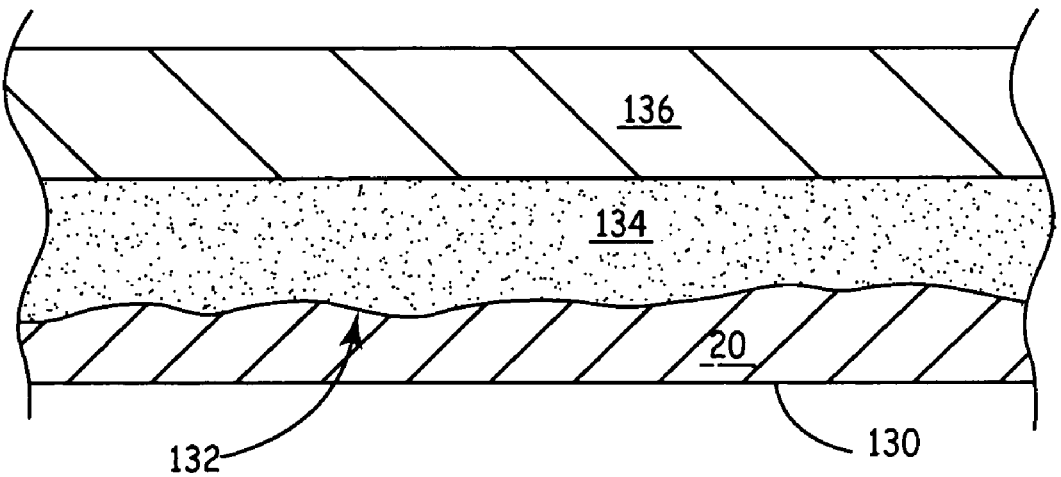

As shown in FIGS. 9A and 9B, in a step 240, the substrate 20 and the carbon layer 136 are heated to a temperature of between approximately 800° and 1000° C. at a pressure of approximately 10E–6 Torr for approximately 1 hour (e.g., between approximately 30 and 90 minutes). During this vacuum baking step, alcohol provided with the carbon-containing material is evaporated and/or pyrolized. At least a portion of the carbon atoms included in the layer of carbon material 136 chemically react with metal atoms to form a carbide layer 134. For example, according to an embodiment in which the substrate is made of titanium, a titanium carbide layer 134 forms during the vacuum baking step 240. The carbon atoms may displace oxygen atoms in the native oxide (e.g., titanium dioxide) formed on the surface of the substrate 20 and/or may react with metal atoms included in the substrate 20.

The thickness of the carbide layer 134 may at least in part be determined by the amount of time the substrate 20 and carbon layer 136 are heated in the vacuum baking step 240. According to an embodiment, only a portion of the carbon layer 136 is consumed during the vacuum baking step 240, and a layer of unreacted carbon-containing material 136 remains adjacent the carbide layer 134. Although not depicted in FIG. 9A or 9B, according to an alternative embodiment of the invention the entire carbon layer 136 is consumed in the vacuum baking step 240 and another layer of carbon-containing material may be optionally provided adjacent the carbide layer 134. The additional layer of carbon containing material may have a composition which is the same as or different from that of the carbon material used to form the carbide layer.

In a step 250, the substrate 20, the carbide layer 134, and the unreacted carbon layer 136 is cooled to a temperature of between approximately 20° and 100° C.

Figure 9C:
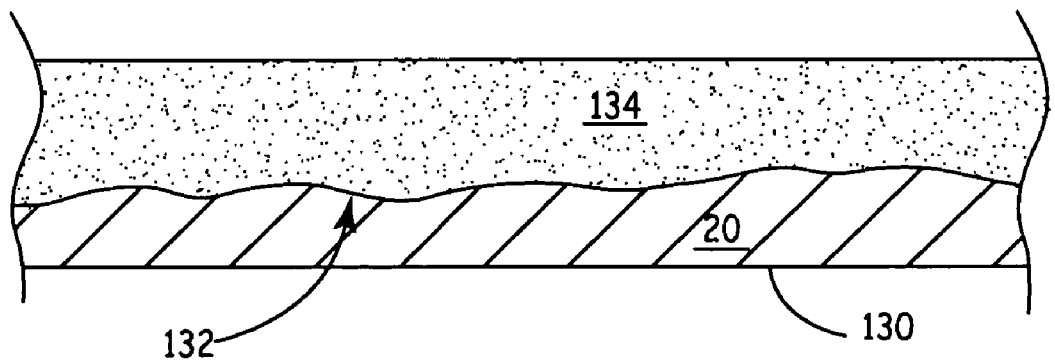

In step 260 of FIG. 10 and as depicted in FIG. 9C, the unreacted carbon layer 136 is removed so that only the carbide layer 134 is exposed and thus serves as the cathode active material for the electrochemical cell. The carbon layer 136 may be removed using any of a variety of techniques manual, machine assisted, chemically or a combination thereof. The removal of carbon layer 136 may comprise a manual or machine assisted method of abrading, rubbing, scraping, scuffing, chafing, filing, grating, brushing, polishing, wiping, and/or sanding and the like. Alternatively, the method of removing the carbon layer 136 may comprise sanding, grinding, buffing, pneumatically-blasting with particulate material, and/or polishing and the like.

Optionally, according to the present invention, the titanium carbide layer 134 and the titanium substrate 20 are heated in a step 260 to a temperature of between approximately 300° and 500° C. in an oxygen-containing ambient or atmosphere (e.g., air, pure oxygen, etc.) for a period of between approximately 30 and 90 minutes. In this optional step, at least a portion of the titanium carbide layer 134 is activated such that oxygen-containing functional groups such as CO, COOH, and C=O are created to form an activated carbide region.

According to the present invention, a wet electrolytic valve metal capacitor can be fabricated having a reduced ESR, a modicum of fault tolerance, and enhanced manufacturability due to the variety of techniques for, and ease of, deposition of a carbon cathode on a portion of a capacitor canister or other substrate.

The preceding specific embodiments are illustrative of processes for initially depositing a carbon material on a titanium substrate to fabricate titanium carbide cathodes usable in capacitors, particularly capacitors incorporated into an IMD, in accordance with the present invention. However, other expedients known to those skilled in the art or disclosed herein, and existing prior to the filing date of this application may be employed without departing from the invention.

The invention claimed is:

1. A carbide cathode associated with an implantable medical device, consisting of:
   a titanium substrate; and
   a layer of titanium carbide disposed on a surface portion of said substrate, the carbide formed from carbonaceous material.

2. A cathode according to claim 1, wherein the titanium substrate comprises a substantially flat sheet of titanium.

3. A cathode according to claim 1, wherein the titanium substrate comprises an interior portion of a casing for a capacitor.

4. A cathode according to claim 3, wherein the capacitor further comprises:
   a valve metal anode spaced from the cathode;
   a porous separator material disposed between the valve metal anode and the cathode; and
   a liquid electrolyte in fluid communication with both the valve metal anode and the cathode.

5. A cathode according to claim 4, wherein the valve metal anode comprises a tantalum anode slug.

6. A cathode according to claim 5, wherein the capacitor is operatively coupled within an implantable medical device.

7. A cathode according to claim 6, wherein the implantable medical device comprises a cardioverter-defibrillator.

8. A cathode according to claim 7, further comprising a pair of capacitors operatively coupled within the cardioverter-defibrillator.

9. A carbide cathode associated with an implantable medical device, consisting of:
   a titanium substrate; and
   a layer of titanium carbide disposed on a surface portion of said substrate, wherein the carbide formed from graphite.

10. A carbide cathode associated with an implantable medical device, consisting of:
    a titanium substrate; and
    a layer of titanium carbide disposed on a surface portion of said substrate, the carbide formed from carbonaceous material,
    wherein a portion of the carbonaceous material remains at the layer of the titanium carbide.

* * * * *